Nov. 26, 1929.  A. G. FITZ GERALD  1,737,368
INNER TUBE FOR PNEUMATIC TIRES

Filed Nov. 6, 1928

Inventor,
A. G. FitzGerald
By Robert M. Pierson
Atty.

Patented Nov. 26, 1929

1,737,368

UNITED STATES PATENT OFFICE

ARTHUR G. FITZ GERALD, OF BROOKLINE, MASSACHUSETTS

INNER TUBE FOR PNEUMATIC TIRES

Application filed November 6, 1928. Serial No. 317,677.

This invention relates to puncture-sealing pneumatic tubes of the compression-tread type, and it has for its object to provide a better tube of this class, which can be made by less expensive methods, and is more easily adjusted in the outer casing or cover when furnished as a separate inner tube.

Prior commercial tubes of this class have uniformly been made by the inside-out method which consists in building the tube with a thickened tread wall and vulcanizing it on a mandrel, removing the tube, turning it inside out and splicing the ends together. Frequently a fabric or other restrictive band is incorporated in the tread to restrain lateral expansion of the tread rubber. This method results in a tube wherein the tread rubber, even when the tube is uninflated, is in a condition of initial compressive stress due to the crowding of the original outer tread rubber into smaller internal dimensions. The manufacture of such tubes is very costly, the tube is difficult to adjust properly in its casing, and the restrictive fabric tread band, when one is employed, is under excessive strain tending to cause separation from the rubber and breaking of the tube wall at the edges of said band. Nevertheless this plan of tube construction has persisted for many years because of belief in the necessity for a very high transverse compression of the tread rubber.

On the other hand, former attempts to mold a compression-tread tube in its final uninflated form have proceeded on the erroneous theory that the desired compression could be obtained by merely reversing the curvature of a strongly concave tread wall, through inflation of the tube to a circular form in cross-section. This theory neglects the excessive amount of inflation pressure required to stretch the middle of such a tread to its final position, and also the effect of such excessive stretching in preventing any effective net compressive stress in the rubber.

My present invention involves a new theory and mode of operation based on the discovery that equal or better sealing of punctures can be obtained for a given thickness of tread-wall rubber, with considerably less compression than has heretofore been employed, and without any initial stress in said rubber. The tube is formed more nearly in its ultimate toric shape, with a substantially flat tread wall whose shoulders extend beyond the ultimate inflated outline, and the entire compressive stress is created in the tread, through inflation of the tube to service pressure, by inwardly contracting the margins of said tread. Such a tube can be cheaply molded in its final uninflated form, can be easily adjusted to fit in a casing, without wrinkling or pinching when inflated, and involves less strain at the edges of the fabric tread band when one is employed.

Of the accompanying drawings.

Figure 1:
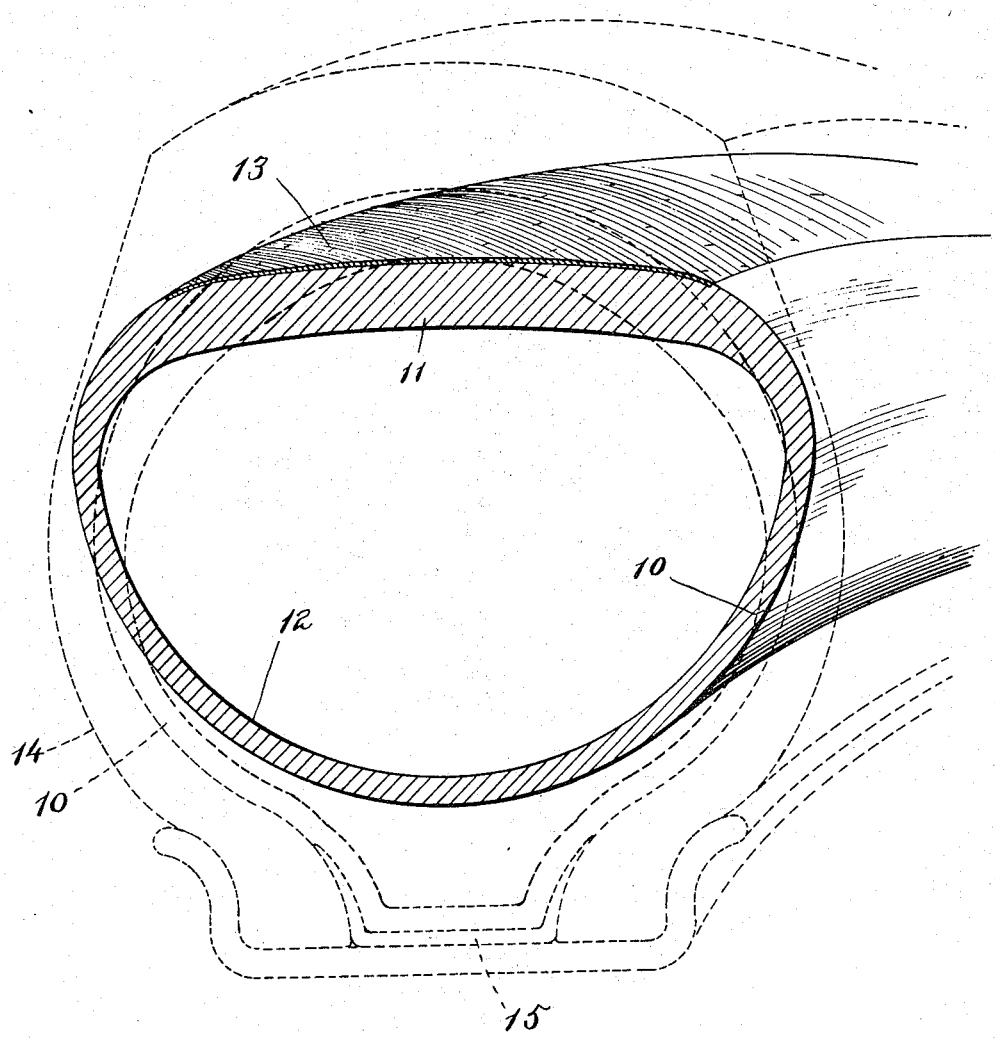
Fig. 1 is a cross-sectional perspective view showing a short section of an inner-tube constructed according to my invention, in its natural or molded shape, the tube in its inflated condition and a tire casing with which the tube is adapted to be used being represented in broken lines.

My improved tube 10 is made of vulcanized, soft-rubber compound, preferably with a relatively thick tread-wall 11 and a belly-wall 12 of ordinary thickness, the margins of the tread-wall gradually tapering into the side walls. The center of the tread-wall is preferably its thickest part, but the same thickness may be preserved for a considerable distance on either side of the middle line, the exact shape and relative dimensions of the tread cross-section being subject to variation.

While some of the benefits of my invention may be realized without employing a reinforcing strip, I prefer to make use of a strip such as 13 placed circumferentially in the tread-wall at or near the outer surface thereof and integrally vulcanized thereto. The width of this strip may be varied and it might extend down the sides of the tube but is shown as covering merely the greater portion of the tread. This reinforcing fabric may be of any of the types commonly employed in compression tubes, that is, either square-woven or thread or cord fabric, with or without weak weft threads, and laid either with the threads on the bias or lying straight across the tread. The layers of fabric may be one or more in number. I prefer to employ a single layer of bias-laid thread fabric as set forth in my prior Patent No. 1,585,339 of May 18, 1926.

The tread-wall 11 is molded substantially flat. It may either be perfectly flat in a transverse direction, for the greater portion of its width, or it may have a slight convexity as exemplified in the drawings, or it could be slightly concave, all of which shapes I include under the term "substantially flat". It should not be strongly convex or concave because in the former case compression would be lost and in the latter case too much deformation of the molded tread would be required in pressing it out to the casing.

The belly 12 of the tube may have any desired form but I prefer the substantially semi-circular shape here shown as lending itself to vulcanization in a steam-jacketed mold without producing thin places in the tube walls and also as attaining a desirable relation of length of the inner periphery of the tube to that of the cavity in the tire casing which makes it easy to insert the tube without pinching or wrinkling and allows for longitudinal contraction of the belly to contract the tread shoulders and impart compression to the tread rubber.

The shape and dimensions are such, as compared with the tire casing 14 in which the tube is used, that the margins of the tread-wall 11, with the tube in its natural shape, would extend laterally somewhat beyond the contour of the inner side of the tire casing as indicated in Fig. 1, so that said tread-wall has to be deformed slightly while moving its margins toward each other in placing the tube in a casing. In other words, the molded width of this flattened tread wall is greater than the length of the chord of the inner, transverse arc of the tread wall of casing 14, or the corresponding arc of the inflated tube. The cross-sectional circumference of the tube is preferably slightly less than that of the space within the casing 14 in order to avoid the formation of creases or wrinkles when the tube is inflated and allow it to fit smoothly in the casing and be reinserted without wrinkles after being used for a considerable time. This involves some extension of the tube-walls in cross-sectional circumference when a fresh tube is inflated in the casing, but such extension takes place mainly in the thin-walled belly.

The outer circumference of the tread-wall 11 is made slightly shorter than that of the inner periphery of the casing 14 at the dome or highest point of the latter, and the inner periphery of the tube belly between the tire beads is made somewhat longer in circumference than its seat upon the tire flap 15 or the rim in order that the inflation of the tube, accompanied by a shortening of this inner periphery, may draw down and shorten the lateral distance between the shoulders or margins of the tread-wall 11. The distance of the molded outer periphery from the dome of the casing, and the distance of the molded inner periphery from the rim or flap are subject to some variation according to design and size of tire. The principal purpose of the outer clearance is to afford some tolerance in fitting the tube to different casings which may vary more or less in outer circumference of the tube-receiving cavity. In the illustration given, this clearance is about 9½% of the radial depth of said cavity, which for a nominal 32-inch diameter casing would involve a longitudinal stretch of about 3% for the middle of the tread wall, but if the same tube were placed in a 30-inch casing of like cross-section, the stretch would be less or nil. Obviously, the less this stretch amounts to, the less there will be to subtract from the transverse compression and the greater will be the net compressive stress available for puncture sealing. The clearance at the inner periphery should be large enough to allow sufficient longitudinal contraction of said inner periphery, caused by inflation of the tube, to contract the tread shoulders and thus impose the transverse compression, but not so large that objectionable wrinkling of the belly will occur in reaching its seat. In the illustration given, this inner clearance is about 16½% of the depth of the tube-receiving cavity, but considerable latitude is allowable in its amount.

My improved tube may be made up from a strip or strips of rubber compound, the valve inserted and the seam or seams made in the raw stock in any of the ways commonly practiced in the manufacture of molded inner-tubes. It is then placed in a tube-mold of any suitable type having a molding cavity adapted to impart the cross-sectional shape shown in Fig. 1 or any slightly modified shape of the same general character, the mold is closed and the tube is inflated with pressure fluid and subjected to vulcanization in the mold, which results in producing a seamless molded tube of the shape described.

Figure 2:
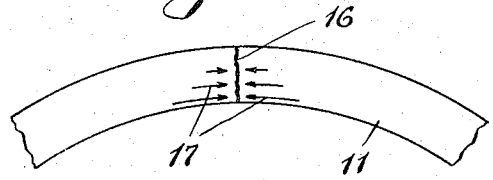
Fig. 2 is a cross-section of the tread-wall of the tube in its convex or inflated shape, illustrating the compression effect in sealing a puncture.

When placed in a tire and inflated, the tread and lower belly walls of tube 10 are pushed out to the tire casing while its shoulders are drawn in as indicated by the broken-line position of said tube in Fig. 1, and its working or flexing portion takes a shape substantially circular in cross-section or slightly oblate-elliptical as determined by its own characteristics and those of the tire casing. In so doing, the tread-wall 11 is slightly stretched circumferentially at the center to close up the space between it and the casing, and at the same time the margins of the tread-wall are drawn downwardly and inwardly as previously described. The outer longitudinal stretch was previously assumed as about 3%, although it could be less, for reasons given. The transverse compression at the inner side of the tread-wall of the tube, however, in taking its arcuate shape, is considerably greater than this amount and there is therefore a net compressive stress in the tread-wall rubber which tends to prevent the leakage of air when said tread-wall is punctured and to seal the hole when the puncturing object is removed. While the amount of this stress is difficult to calculate exactly, an idea of its magnitude may be obtained by considering the case of a tube tread wall ½ inch thick mounted in a 6-inch, 6-ply, balloon tire. A segment of such a tread-wall four inches in transverse length and of uniform thickness would have the length of its inner surface reduced by 20% in taking a circular, arcuate shape if there were no stretching at the outer, and no transverse flow at the inner surface. Substracting the 3% circumferential stretch, there is a net theoretical compression of 17% in the inner portion of the tread-wall rubber of the tube. This compressive stress, tending to seal a puncture hole 16, is graphically illustrated by the arrows 17 in Fig. 2. The bending of the tread-wall 11 to this shape is accompanied by an increase in its thickness, since the rubber can flow more readily inwardly than it can transversely in the direction of shear. Allowing for some transverse flow at and near the inner surface and also for some transverse stretching of the outer surface it is probable that the net compressive stress in a fresh tube of this construction, when inflated in a tire, is about 10 to 15% and that such stress is not entirely removed after continued use through the permanent set acquired by the rubber, even if no reinforcing fabric is employed in the tread.

A reinforcing fabric strip such as 13, however, has an important function in avoiding or reducing the transverse stretching of the outer surface of the tread-wall 11 when the latter takes its arcuate shape by inflation.

My improved molded compression tube, by reason of its quasitoric shape, is more easily inserted in the casing by manipulations familiar to tire users than compression tubes made by the former inside-out method, in that it permits the user to dispense with the deflation following partial inflation which was desirable in order to get those tubes properly fitted before placing the casing on the rim.

I claim:

1. A self-sealing, compression-tread, vulcanized-rubber, endless pneumatic tube having a longitudinally contractible belly and a substantially-flat, unstressed tread wall with contractible shoulders extending beyond the ultimate inflated outline.

2. A self-sealing, compression-tread, vulcanized-rubber, endless pneumatic tube having a contractible belly, a substantially-flat, uncompressed tread wall with contractible shoulders extending beyond the ultimate inflated outline, and an unstressed restrictive fabric band incorporated in the outer portion of said tread wall.

3. A self-sealing, compression-tread, endless, valcanized-rubber pneumatic tube having a longitudinally-contractible, relatively thin-walled belly and a substantially-flat, relatively thick, unstressed tread wall with shoulders extending beyond the ultimate inflated outline and contractible by inflation of the tube.

4. In a pneumatic tire, the combination of a tire casing and an inner tube therein having, when uninflated outside the casing, a substantially-flat, unstressed tread wall which would lie close to its seat on the dome of the casing, with its shoulders extending beyond the outline of the casing cavity, and a belly wall which would lie close to its seat but on a larger circumference permitting contraction of said belly wall and contraction of the shoulders to impart the entire compression to said tread wall when the tube is inflated to service pressure in the casing.

5. In a pneumatic tire, the combination of a tire casing and in inner tube therein having, when uninflated outside the casing, a substantially-flat, unstressed tread wall with a middle outside diameter corresponding to a clearance from its seat on the casing not greater than 10% of the depth of the tube-receiving cavity and shoulders extending beyond the ultimate inflated outline, and a belly formed to an inner circumference exceeding that of its seat, the cross-sectional circumference of the tube being slightly less than that of the said tube-receiving cavity.

In witness whereof I have hereunto set my hand this 2nd day of November, 1928.

ARTHUR G. FITZ GERALD.